United States Patent [19]

Hasegawa et al.

[11] 4,193,071

[45] Mar. 11, 1980

[54] CHARACTER DISPLAY APPARATUS

[75] Inventors: Keiji Hasegawa; Yoshikuni Tatara, both of Tokyo, Japan

[73] Assignee: Ricoh Company, Ltd., Tokyo, Japan

[21] Appl. No.: 843,546

[22] Filed: Oct. 19, 1977

[30] Foreign Application Priority Data

Oct. 21, 1976 [JP] Japan ............................. 51/126639

[51] Int. Cl.[2] ............................................ G06K 15/20

[52] U.S. Cl. .................................... 340/723; 340/798; 364/900

[58] Field of Search ............... 354/6, 8, 9; 340/324 A, 340/324 AD, 723; 364/900

[56] References Cited

U.S. PATENT DOCUMENTS

| | | | |
|---|---|---|---|
| 3,715,731 | 2/1973 | Kan | 354/6 X |
| 3,754,229 | 8/1973 | Manber | 340/324 AD |
| 4,054,948 | 10/1977 | Grier et al. | 340/324 A |

*Primary Examiner*—David L. Trafton
*Attorney, Agent, or Firm*—David G. Alexander

[57] ABSTRACT

A CRT display screen of a word processor apparatus displays at least one line of characters. The number of characters in the line is variable, and the character size is automatically adjusted so that the lines fill the width of the screen regardless of the number of characters. The number of characters may be selected from several predetermined numbers such as 80, 96, 128 etc. Alternatively, the number of characters may be determined by the right margin position. In the latter case, when the right margin position is leftward of a predetermined character position, such as 80, the characters may be displayed in 80 character line format with blank spaces rightward of the right margin.

10 Claims, 8 Drawing Figures

CHARACTER DISPLAY APPARATUS

BACKGROUND OF THE INVENTION

The present invention relates to a character display apparatus for a word processor system or the like.

Various types of word processor systems are known in the art. One such system is an automatic typewriter which comprises an electric typewriter combined with a memory unit. The typewriter functions such as backspace, reverse line feed and the like are used to correct typewritten mistakes by means of typeover. The edited script is stored in the memory and played back to produce a perfect typewritten page. Such a system suffers from various drawbacks in that the legibility of the page being initially typed and edited is quite poor due to multiple typeovers. As another drawback, the system is slow since the typewwriter is not available for input during playback.

To overcome these drawbacks, word processor systems comprising cathode ray tube (CRT) display screens have come into widespread use. The cathode ray tube displays one or more lines of characters and allows editing on the screen. Since typeover on a CRT display causes automatic erasure of the previous data, the line or page of character data being input and edited on the screen and exactly resembles the final printed page. After editing on the CRT screen, the page of characters is transferred to a memory and played back therefrom for printing on an electric typewriter or line printer.

A drawback has heretofore existed in the improved word processing systems comprising CRT display screens regarding character line format. Since various business, scientific and legal applications require different numbers of characters in each printed line, it has been standard procedure to either design specialized word processing systems for the various applications or to provide a universal word processing system which accomodates the maximum number of characters per line which may be required in any reasonable application. The number of characters per line may be as high as 150.

Compressing 150 characters into a line on a CRT screen, even using high resolution display circuitry, provides characters of very low visibility, especially when alphabetic characters are displayed in both upper and lower case. It may be impossible to distinguish a lower case "a" from a lower case "s," for example, due to the small display size and limited resolution. These two characters are adjacent on a standard typewriter keyboard, and a frequent typing error is to strike the "a" key rather than the "s" key and vice-versa. In a low visibility display such an error may go undetected during editing and the page printed incorrectly. If the printed page is not proofread, the undetected error may cause a serious problem in an important application. If the page is proofread and the error detected, the error must be corrected on the CRT screen and the entire page played back again to produce a correct printed copy. Such multiple editing is very inefficient from the standpoints of time and cost.

On the other hand, word processing systems are still so expensive that they are often leased rather than sold. Where a business or governmental concern acquires, for an example, a 96 character per line system which features improved visibility and is adequate for most applications, considerable disruption of operations may occur when an occasion arises in which it is necessary to produce a number of documents in 128 character per line format.

SUMMARY OF THE INVENTION

The present invention overcomes the above mentioned drawbacks of the prior art by providing a CRT display apparatus in which the number of characters per line is variable. A lower limit on the number of characters per line, such as 80, may be imposed. In all cases, the frequency of timing pulses in the system is automatically adjusted in such a manner that the lines of characters fill the width of the CRT screen, thus providing maximum character size and visibility.

It is an object of the present invention to provide a character display apparatus in which the number of characters per line is variable and the character size is automatically adjusted so that the lines of characters fill the width of the screen.

It is another object of the present invention to provide a character display featuring maximum visibility.

It is another object of the present invention to provide a character display apparatus which minimizes input and editing errors.

It is another object of the present invention to provide a generally improved CRT display apparatus for a word processing system or the like.

Other objects, together with the foregoing, are attained in the embodiments described in the following description and illustrated in the accompanying drawing.

DESCRIPTION OF THE PREFERRED EMBODIMENTS

While the display apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
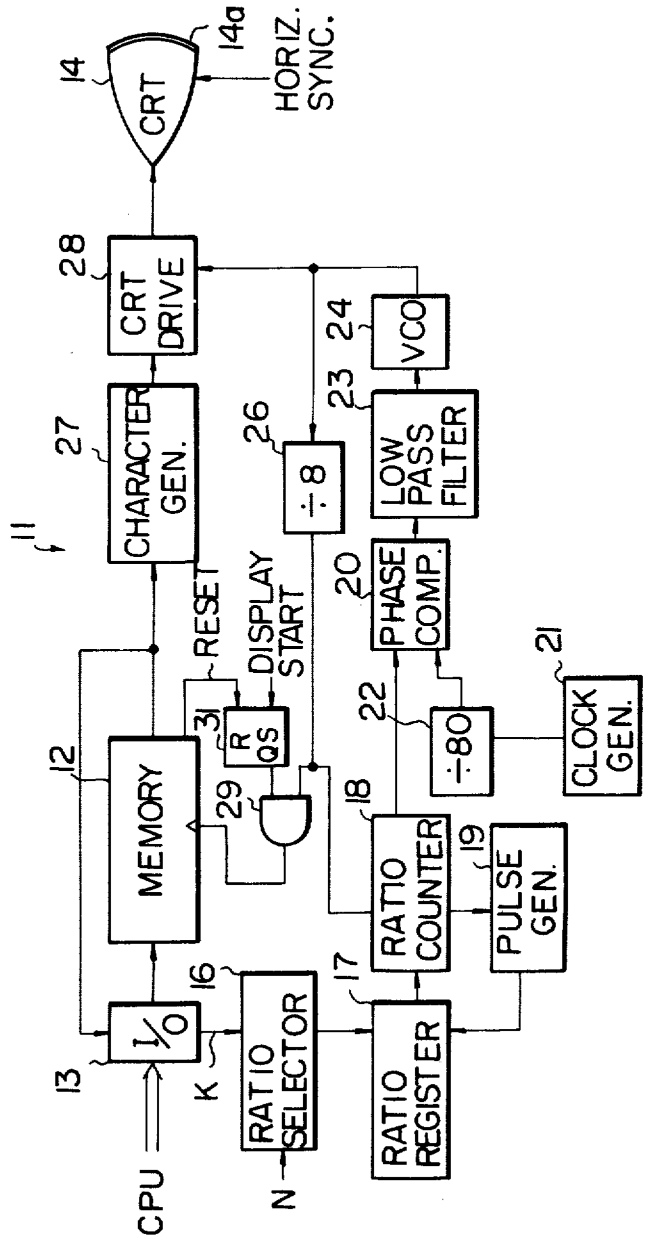
FIG. 1 is a block diagram of a first embodiment of a display apparatus of the present invention.

Referring now to FIG. 1 of the drawing, a first embodiment of a character display apparatus according to the present invention is designated by the reference numeral 11 and comprises a memory 12. Binary data representing alphanumeric characters, symbols, etc. are fed from a central processing unit (not shown) into the memory 12 through an input-output (I/O) unit 13 in either a serial or serial-parallel manner. The characters are initially input into the central processing unit from a keyboard, which is likewise not shown, which preferably has a standard typewriter configuration. The characters represented by the data in the memory 12 are displayed on a cathode ray tube (CRT) display unit 14 in a manner which will be described in detail below. Although the display unit 14 may be capable of displaying an entire page of characters formed in a plurality of lines, such as 24 or 32 lines, it will be assumed for simplicity of description that the display unit 14 displays only a single line of characters. The keyboard is provided with editing functions by which the line of characters may be edited to eliminate any typographical or similar errors. After the characters are input and edited to the satisfaction of the operator, a key on the keyboard is depressed and the line of characters is printed out by a printer which is not shown. Thereafter, the display unit 14 is blanked in preparation for input of another line of characters.

The keyboard is preferably provided with means for adjusting the right and left margins, and thereby defining the number of characters in the line. The number of characters in the line is the number of character positions between the left and right margins. This number is determined either by subtraction or counting and is designated as K. The number K and an optimum number of characters N are applied to a ratio selector 16, the former from the I/O unit 13 and the latter from a preset register or the like (not shown).

The number N is given as follows:

$$N \simeq \frac{\text{the width of a display screen 14a of the display unit 14}}{\text{standard character size + character spacing}}$$

The number N is selected to provide maximum character visibility and may be typically 80 characters per line. Smaller numbers of characters per line will cause spread out and distorted characters. Larger numbers of characters per line will cause smaller sized characters and reduced visibility. However, since numbers of characters per line, such as 96, 128 and 150 may be required for various applications, a larger capability is built into the apparatus 11. In all cases, regardless of the number of characters per line, the line of characters will fill the width of the display screen 14*a* of the display unit 14.

The ratio selector 16 performs a logical comparison of N and K and sets the number N into a ratio register 17 if K is smaller than or equal to N. Where K is larger than N, the ratio selector 16 sets the number K into the ratio register 17.

The number N or K is set from the ratio register 17 into a ratio counter 18 which functions as a down counter. When the ratio counter 18 is decremented to zero, it produces an output signal which triggers a pulse generator 19. An output pulse from the pulse generator 19 is fed back to the ratio register 17 causing the same to again set the number N or K into the ratio counter 18.

Each time the ratio counter 18 is decremented to zero it feeds a pulse to a phase comparator 20 which compares the pulses with clock pulses fed thereto from a clock pulse generator 21 through a frequency divider 22. The frequency divider 22 divides the frequency of the clock pulses by 80. Where the maximum number of characters per line which can be accomodated by the apparatus 11 is 150, the ratio counter 18 must have a capacity of 150. The data for each character typically comprises 8 data bits and an end pointer bit. The memory 12 should have an enlarged capacity of typically 160×9 or 1440 bits. The memory 12 may comprise shift registers or a first-in, first-out random access memory (FIFO RAM).

The output of the phase comparator 20 is a signal indicating the phase difference between the two input pulse trains. This signal is fed through a low pass filter 23 to control the frequency of a voltage controlled oscillator (VCO) 24. The output of the VCO 24 is fed through a frequency divider 26 which divides the frequency of the VCO output by a factor of 8 to the count down input of the ratio counter 18, causing the counter 18 to decrement. The phase comparator 20, low pass filter 23 and VCO 24 constitute a phase locked loop (PLL). The addition of the ratio counter 18 in the loop causes the VCO 24 to produce pulses at a frequency which is 8 times the frequency of the frequency divided clock pulses from the clock pulse generator 21. The frequency ratio is determined by the number N or K set into the ratio counter 18 from the ratio register 17.

The output of the memory 12 is connected to a character generator 27 and also back to the input of the memory 12 through the I/O unit 13 for recirculation of data. The output of the character generator 27 is applied to the display unit 14 through a CRT drive unit 28. The output of the VCO 24 is also applied to the unit 28. The output of the frequency divider 26 is applied to an input of an AND gate 29, the output of which is connected to the read strobe input of the memory 12. Another input of the AND gate 29 is connected to the Q output of a flip-flop 31. The memory 12 produces a reset signal when the last character is read therefrom which is applied to the reset input of the flip-flop 31. A display start signal is applied to the set input of the flip-flop 31.

The characters are preferably displayed on the screen 14*a* in the form of a 7×9 dot matrix. Thus, for each character in the horizontal or the row direction, 7 data dots plus a blank space having a width equal to one dot are provided for a total of 8 horizontal dot positions per character.

The memory 12 preferably has the capacity to store data representing one line of characters. In response to a horizontal sync signal the display unit 14 initiates a horizontal sweep of the screen 14*a*. When the sweep reaches the beginning of the actual display area, a control unit (not shown) feeds the display start pulse to the flip-flop 31, thereby setting the same and enabling the AND gate 29. The output pulses of the VCO 24 are frequency divided by a factor of 8 and fed to the read strobe input of the memory 12 thereby causing the character data to be sequentially read out. For each pulse applied to the memory 12 to read a new character, 8 pulses are applied to the CRT drive unit 28 from the VCO 24 to produce 8 respective dot pulses to cause display of the 7 dot positions and the blank dot space of the scan line of the character read from the memory 12. When the last character has been displayed, the memory 12 produces the reset pulse which resets flip-flop 31 and inhibits the AND gate 29 to prevent further pulses from being applied to the memory 12.

More specifically, the character data is recirculated through the memory 12 nine times, for display of the 9 horizontal scan lines of the dot matrix. A scan line counter (not shown) controls the character generator 27 to select the dot pattern corresponding to the current scan line of the character read from the memory 12. The dot pattern is a function of the binary code representing the character and the number of the scan line. The dot pattern is produced at 7 parallel outputs (not shown) of the character generator 27 which are serially strobed by the CRT drive unit 28 in response to the pulses from the VCO 24 to sequentially display the dots constituting the scan line of the character. A vertical sweep signal applied to the display unit 14 causes downward vertical sweep through the nine scan lines, although not shown or described in detail.

The line of characters is constantly displayed and updated with new input characters until the operator depresses a carriage return key or the like on the keyboard to print the line.

The frequency of the VCO 24 as determined by the number N or K in the ratio register 17 determines the number of characters per line and the character size. The higher the frequency of the VCO 24, the greater the number of characters read from the memory 12 within each horizontal scan period, which is fixed. The character size is equal to the width of the display area of the screen 14*a* divided by the number of characters per line.

Where N=K=80, the division ratio of a frequency divider constituted by the ratio register 17, ratio counter 18 and pulse generator 19 is 80.

Figure 2:
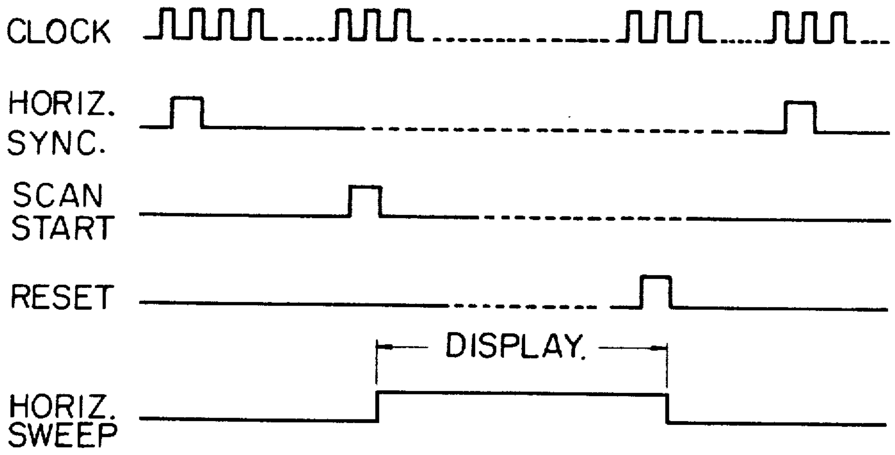
FIG. 2 is a timing diagram of the embodiment of FIG. 1.
Figure 3:
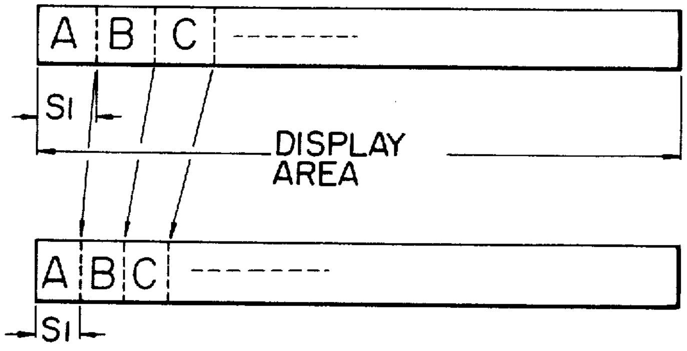
FIG. 3 is a graph illustrating the operation of the apparatus of FIG. 1.

The frequency of the clock pulse generator 21 is selected whereby with this frequency division ratio the frequency of the VCO 24 is such that 640 pulses are produced by the VCO 24 during the display time of the horizontal sweep as illustrated in FIG. 2. This frequency is divided by the frequency divider 26 so that 80 read strobe pulses are applied to the memory 12 during the display time. As illustrated in the upper section of FIG. 3, the character width for 80 characters per line is designated as $S_1$, and is equal to the width of the display area of the screen 14*a* divided by 80.

In a case where K=96, for example, the frequency division ratio provided by the ratio counter 18 is increased by a factor of 1.2 to 96. In order to maintain lock, the phase locked loop must increase the frequency of the VCO 24 by a corresponding amount. Thus, 1.2 or 6/5 more read strobe pulses are applied to the memory 12 during the display time, and 96 characters are displayed. As illustrated in the lower section of FIG. 3, the character width is reduced by a factor of 1.2 to $S_2$, where $S_2$ is equal to the width of the display area of the screen 14*a* divided by 96.

In summary, it will be seen that increasing the frequency division ratio provided by the ratio counter 18 increases the frequency of the VCO 24 by an exactly proportional amount. The pulses produced by the VCO 24 provide the read strobes for the memory 12 and the dot display pulses for the display unit 14. As a result, the exact number of characters indicated by the number N or K set in the ratio register 17 is displayed on the screen 14*a* in such a manner that the line of characters exactly fills the width of the display area on the screen 14*a*. The number of characters may be any integer between 80 and 150. It will be understood that means other than counting the number of character positions between the left and right margins may be employed to determine the number K.

Figure 4:
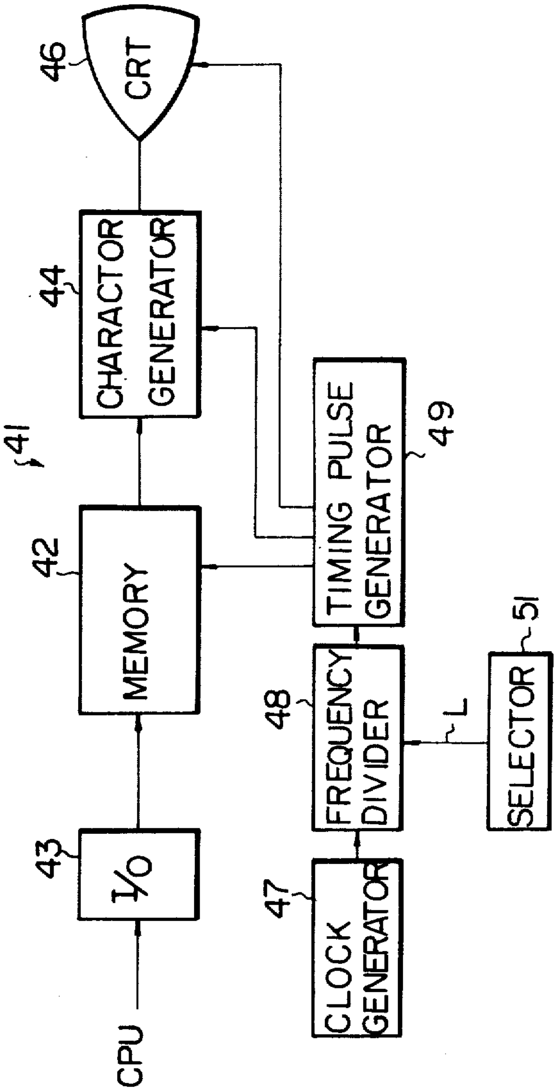
FIG. 4 is a general block diagram of a second embodiment of the present invention.
Figure 5:
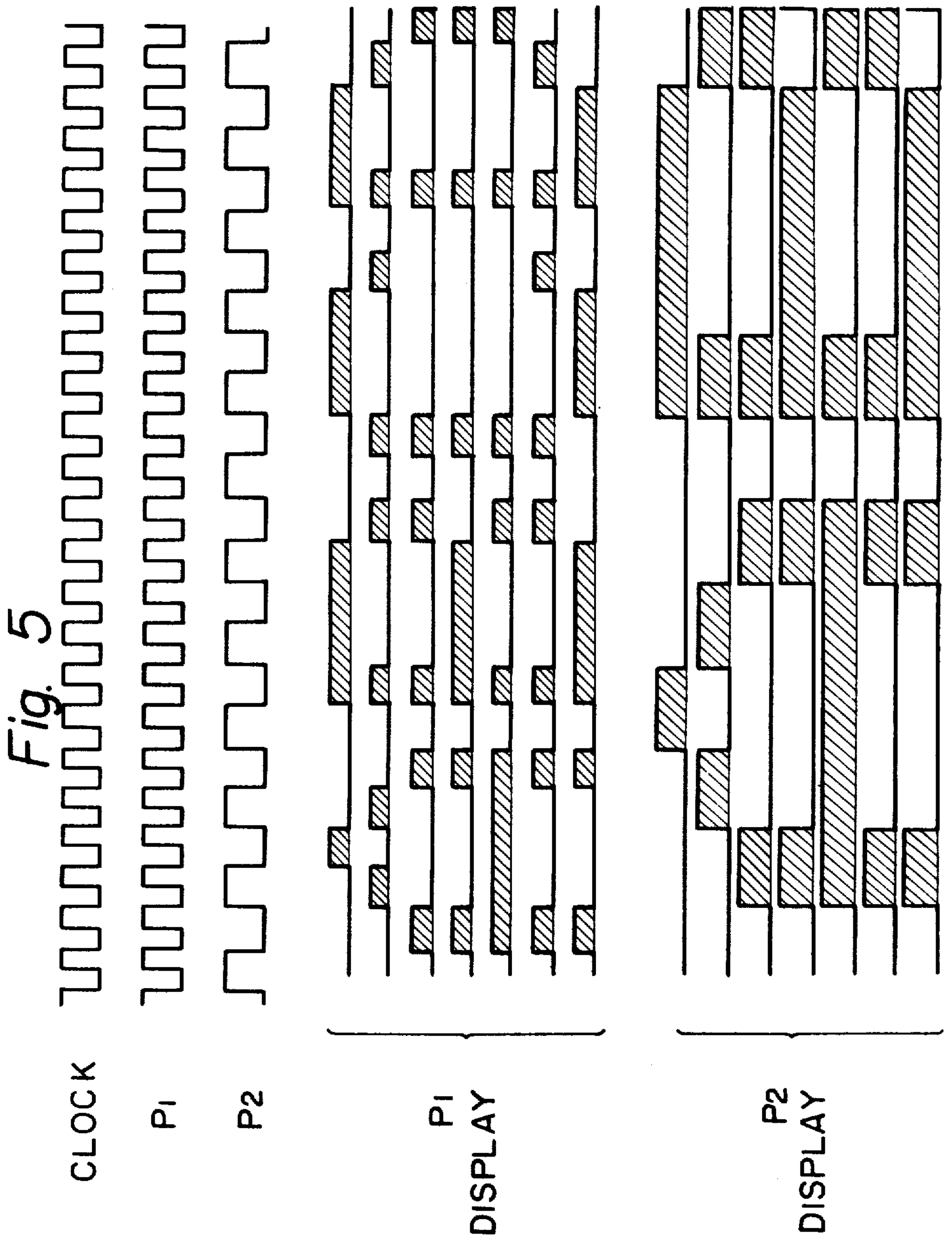
FIG. 5 is a combined graph and timing diagram illustrating the operation of the embodiment of FIG. 4.

FIG. 4 illustrates another embodiment of the present invention. A character display apparatus 41 comprises a memory 42 in which character data is entered through an input-output (I/O) unit 43 in the same manner described hereinabove. From the memory 42, the character data is fed through a character generator 44 to a CRT display unit 46.

Clock pulses from a clock pulse generator 47 are fed through a variable frequency divider 48 to a timing pulse generator 49 which feeds pulses to the memory 42, character generator 44 and CRT display unit 46 in response thereto. The desired number of characters per line, here designated as L, is fed to the frequency divider 48 from a selector 51 to determine the frequency division ratio. The lower the frequency division ratio, the higher the pulse frequency and the greater the number of characters per line. The selector 51 may comprise a dial by which the operator may select the desired number L from a plurality of predetermined numbers of characters per line such as 80, 96, 128 and 150. The timing pulse generator 49 feeds memory read strobe pulses to the memory 42, dot display pulses to the character generator 44 and synchronization pulses to the display unit 46.

Figure 6:
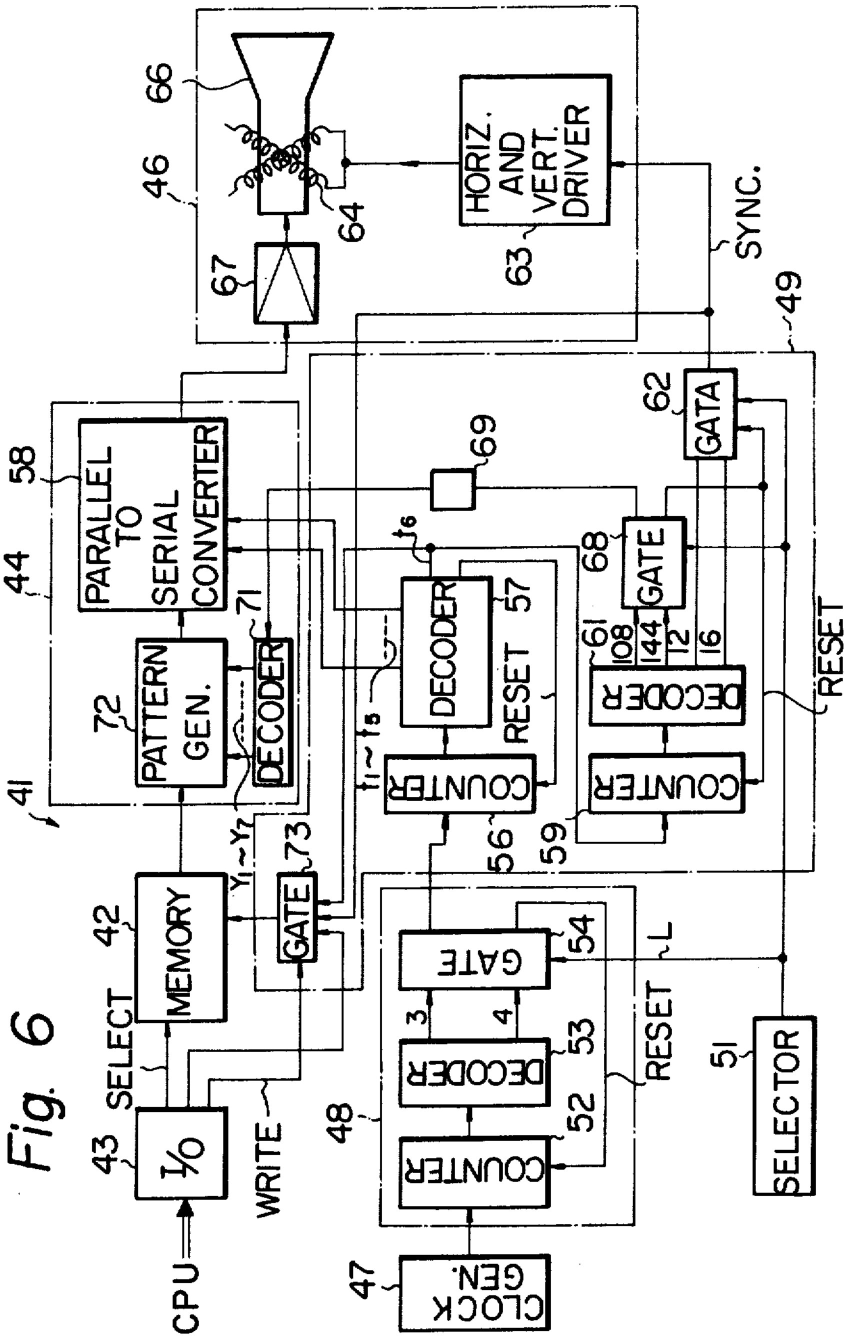
FIG. 6 is a more detailed diagram of the embodiment of FIG. 4.

The construction of the apparatus 41 is illustrated in more detail in FIG. 6. It will be assumed for simplicity of description that the apparatus 41 is capable of displaying either 98 or 128 characters per line (L=96 or 128). In this case, the display unit 46 is adapted to utilize a 5×7 dot matrix. The frequency divider 48 comprises an up-counter 52 having a maximum count of at least 4. The output of the counter 52 is connected to a decoder 53 which is adapted to selectively decode the counts of 3 and 4 in the counter 52 in accordance with the value of L. Where L is 96, the decoder 53 decodes the count of 4. Where L is 128, the decoder 53 decodes the count of 3.

When the selected 3 or 4 count is decoded, the decoder 53 feeds a pulse signal to a gate 54 which feeds a reset signal to the counter 52 causing the same to reset to zero. The pulse from the decoder 53 is fed through the gate 54 to a counter 56 of the timing pulse generator 49. It will be understood that the frequency divider 48 has a selectable frequency division ratio of 3 or 4.

The counter 56 has a maximum count of at least 6 corresponding to the 5 horizontal dot positions plus a blank space dot position. The counts 1 to 6 in the counter 56 are decoded by a decoder 57 which produces dot pulses $t_1$ to $t_6$ at corresponding outputs. The pulses $t_1$ to $t_5$ are applied sequentially to a parallel to serial converter 58 of the character generator 44 as illustrated in the upper section of FIG. 7. The pulse $t_6$ is fed to an up-counter 59 of the timing pulse generator 49 which has a maximum count of at least 144. The decoder 57 further feeds a reset pulse back to the counter 56 to reset the same after the count of 6.

The output of the counter 59 is connected to a decoder 61 which is arranged to produce output pulses in response to the counts of 12, 16, 108 and 144 respectively. The 12 and 16 count outputs are fed to a gate 62 which produces at its output a horizontal synchronization pulse signal SYNC. The gate 62 is selected to produce the pulse SYNC in response to the 12 count where L=96 and the 16 count where L=128 respectively. The signal SYNC is fed to a horizontal and vertical deflection driver 63 of the display unit 46 which controls deflection coils 64 of a CRT display tube 66. The output of the parallel to serial converter 58 is applied through an amplifier 67 to the tube 66 for intensity modulation thereof.

The 108 and 144 outputs of the decoder 61 are applied to a gate 68 which selects the 108 output for L=96 and the 144 output for L=128 respectively. The gate 68 feeds a reset pulse back to the counter 59 in response to the selected 108 or 144 count to reset the same to zero.

Also in response to the selected 108 or 144 count, the gate 68 feeds a pulse to a scan line counter 69. The counter 69 is an up-counter having a capacity equal to the number of horizontal scan lines of the dot matrix pattern which in this case is 7. The output of the counter 69 is connected to a scan line decoder 71 of the character generator 44. The decoder 71 produces a high line select output $Y_1$ to $Y_7$ in accordance with the respective count in the counter 69.

The $t_6$ output of the decoder 57 is also applied to a gate 73 which is connected to the strobe input of the memory 42. The input-output unit 43 also feeds a select signal to the gate 73 to select between read and write pulses. For storing data in the memory 42 the select signal enables the write input of the memory 42 to receive write pulses from the unit 43. For reading data out of the memory 42 for display, the select signal enables the read input of the memory 42. The SYNC signal is also applied to the gate 73 from the gate 62.

In operation, the frequency of the clock pulse generator 47 is divided by 4 for $L=96$. In response to each 6th pulse output of the gate 54 the decoder 57 produces the $t_6$ pulse which is fed to the memory 42 to select the next character. The $t_1$ to $t_5$ pulses are fed to the parallel to serial converter 58. The pattern generator 72 produces 6 parallel outputs (5 dot positions plus a space position) corresponding to the character as determined by the binary code of the character read from the memory 42 and the horizontal dot matrix scan line number corresponding to the count in the counter 69 and decoded by the decoder 71. The $t_1$ to $t_5$ pulses cause the converter 58 to sequentially strobe the outputs of the pattern generator 72 and produce the dot signals which are fed to the tube 66 to display the scan line of the character.

The $t_6$ pulse is also fed to the counter 59 which serves to count the number of characters already displayed and point to the next character. Referring to FIG. 8, it will be seen that the retrace portion of the horizontal sweep signal has a period equal to $T_R$ which is the duration of the SYNC pulse. The leading edge of the SYNC pulse initiates the retrace or falling portion of the horizontal sweep signal. The trailing edge of the SYNC pulse initiates the display portion of the horizontal sweep signal which is designated as $T_D$. The total horizontal sweep period is equal to the sum of the retrace and display periods ($T_R+T_D$) and is designated as $T_S$. A character display period is designated as $T_C$ in FIG. 7, and for $L=96$, $T_D=96T_C$.

The gate 62 is adapted to produce a high output in response to the reset signal from the gate 68 and switch the output to low in response to the count of 12 in the counter 59 by means of the decoder 61 and a flip-flop (not shown) in the gate 62. Thus, for $L=96$ the retrace time $T_R$ corresponds to 12 pulses $t_6$ or 12 character periods $T_C$. The SYNC pulse inhibits the gate 73 so that the first 12 $t_6$ pulses do not reach the memory 42.

The 96 characters are displayed during the final 96 counts of the counter 59. It will be noted that $96+12=108$. In response to the 108 output of the decoder 61 applied through the gate 68, the scan line counter 69 is incremented. In the same manner as with the previous embodiment, the characters are recirculated through the memory 42 once for each scan line which is in this case 7 times, since a $5\times7$ dot matrix is utilized. The scan line counter 69 and decoder 71 provide the pattern generator 72 with the scan line input required to produce the corresponding scan line dot pattern of the character read from the memory 42.

To increase the number of characters per line to 128, the pulse frequency is increased by selecting the 3-count output of the decoder 53. Since the frequency division ratio is decreased to $\frac{3}{4}$ the value for 96 characters per line, the pulse frequency is increased to 4/3 the previous value. Thus, $96\times4/3=128$ characters will be read from the memory 42 during the display period $T_D$, which is fixed. Likewise, 16 $t_6$ pulses will produced during the retrace period $T_R$ and 144 $t_6$ pulses will be produced during the total horizontal sweep period $T_S$. It will be noted that $12\times4/3=16$ and $108\times4/3=144$. Thus, the gates 62 and 68 are adjusted to produce output signals at the correct timing relative to the horizontal sweep.

In summary, it will be seen that the frequency of the pulses for reading the memory 42 and producing dot pulses for the display unit 46 is increased where the number of characters per line is increased, thereby displaying more characters in a predetermined and fixed time period.

Figure 7:
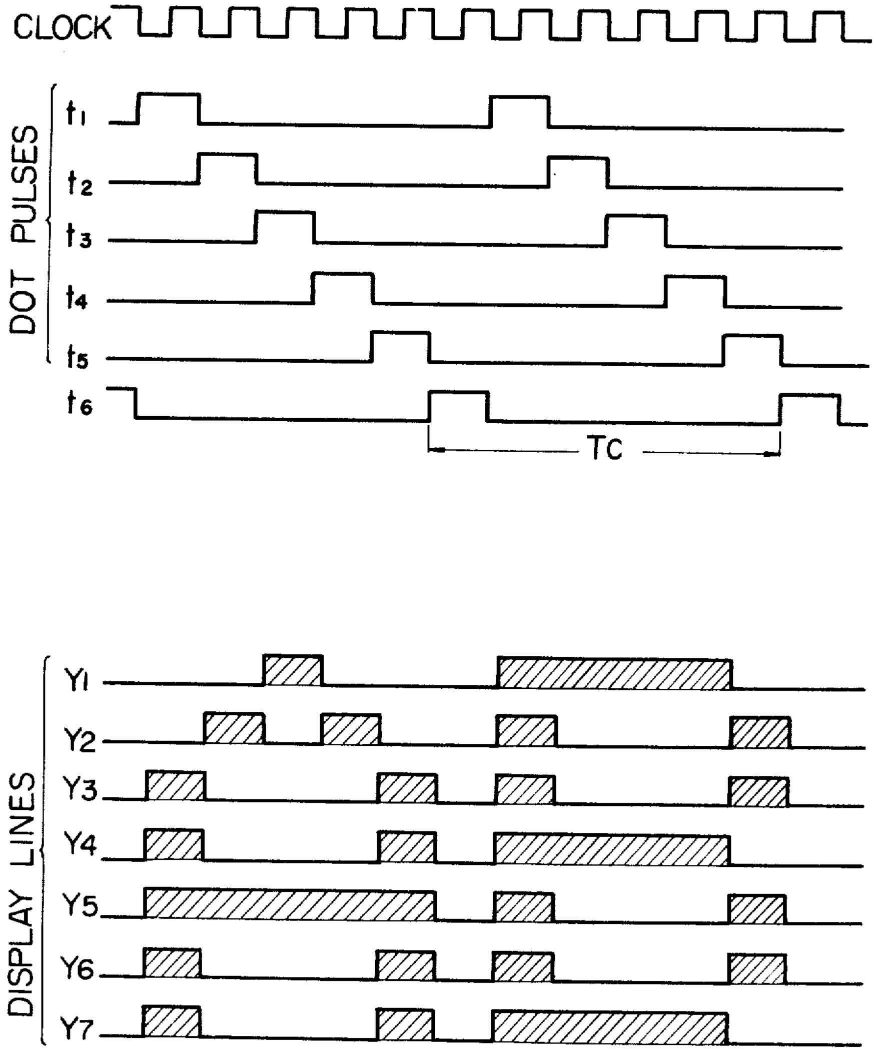
FIG. 7 is another combined graph and timing diagram illustrating the operation of the apparatus of FIGS. 4 and 6.
Figure 8:
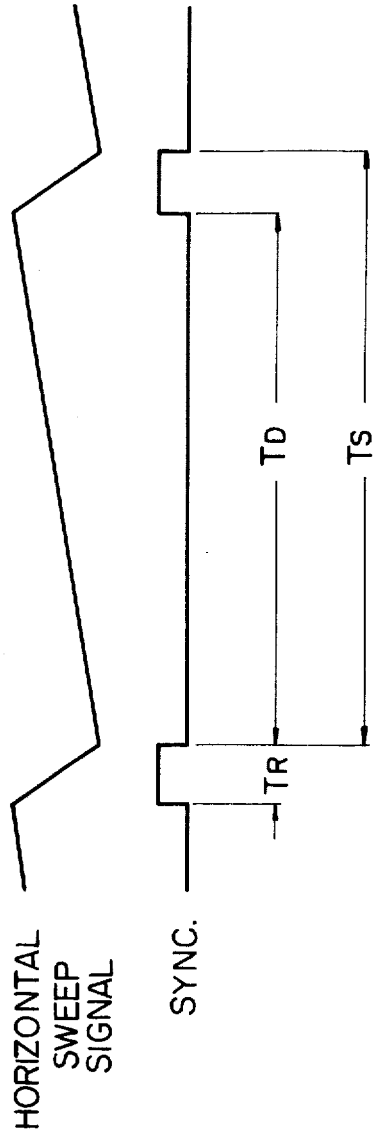
FIG. 8 is a graph illustrating the horizontal sweep timing of the embodiment of FIGS. 4 and 6.

FIG. 7 illustrates a simplified, exemplary case where the number of characters per line is halved by halving the frequency of dot pulses. Dot pulses $P_2$ have $\frac{1}{2}$ the frequency of dot pulses $P_1$. Thus, the display produced by the $P_2$ pulses has $\frac{1}{2}$ the number of characters per line as the display produced by the $P_1$ pulses.

Thus, it will be seen that the present invention provides a practical and useful method and apparatus by which the number of characters in a line of a CRT display can be adjusted to any desired value and that the line of characters is automatically adjusted in size to fill the width of the display. Various modifications will become possible for those skilled in the art after receiving the teachings of the present disclosure without departing from the scope thereof.

What is claimed is:

1. A display apparatus comprising:

memory means for storing data representing a line of characters;

display means for displaying the line of characters;

pulse generator means for generating pulses to transfer the data from the memory means to the display means for displaying the line of characters;

selector means for selecting a number of characters in the line; and frequency variation means for varying a frequency of the pulses in accordance with the number of characters in the line in such a manner that the line of characters fills a display area of the display means.

2. A display apparatus as in claim 1, in which the display means comprises a cathode ray tube and sweep generator means for applying horizontal and vertical sweep signals of fixed respective frequencies to the cathode ray tube.

3. A display apparatus as in claim 1, in which the frequency variation means comprises a variable frequency divider.

4. A display apparatus as in claim 1, in which the display means comprises a character generator, the pulses being applied to the character generator.

5. A display apparatus as in claim 4, in which the character generator and display means are constructed to display the line of characters in dot matrix form in response to the pulses.

6. A display apparatus as in claim 2, in which the sweep generator means is constructed to be triggered by the pulses to generate the horizontal and vertical sweep signals.

7. A display apparatus comprising:

memory means for storing data representing a line of characters;
display means for displaying the line of characters;
pulse generator means for generating pulses to transfer the data from the memory means to the display means for displaying the line of characters;
selector means for selecting a number of characters in the line; and
frequency variation means for varying a frequency of the pulses in accordance with the number of characters in the line in such a manner that the line of characters fills a display area of the display means;
the selector means comprising means for selecting the number of characters in the line from a plurality of predetermined numbers.

8. A display apparatus comprising:
memory means for storing data representing a line of characters;
display means for displaying the line of characters;
pulse generator means for generating pulses to transfer the data from the memory means to the display means for displaying the line of characters;
selector means for selecting a number of characters in the line; and
frequency variation means for varying a frequency of the pulses in accordance with the number of characters in the line in such a manner that the line of characters fills a display area of the display means;
the selector means comprising means for storing the number of characters in the line and controlling the frequency variation means to vary the frequency of the pulses to correspond to a predetermined number of characters in the line when the stored number of characters in the line is less than the predetermined number.

9. A display apparatus comprising:
memory means for storing data representing a line of characters;
display means for displaying the line of characters;
pulse generator means for generating pulses to transfer the data from the memory means to the display means for displaying the line of characters;
selector means for selecting a number of characters in the line; and
frequency variation means for varying a frequency of the pulses in accordance with the number of characters in the line in such a manner that the line of characters fills a display area of the display means;
the frequency variation means comprising a phase locked loop.

10. A display apparatus as in claim 9, in which the phase locked loop comprises a variable frequency divider, a phase comparator for comparing output pulses of the frequency divider with the pulses from the pulse generator means and a voltage controlled oscillator for producing output pulses under control of the phase comparator, the output pulses of the voltage controlled oscillator being applied to the memory means and to the variable frequency divider.

* * * * *

UNITED STATES PATENT AND TRADEMARK OFFICE

CERTIFICATE OF CORRECTION

PATENT NO. : 4,193,071

DATED : Mar. 11, 1980

INVENTOR(S) : Keiji Hasegawa, Yoshikuni Tatara

It is certified that error appears in the above—identified patent and that said Letters Patent is hereby corrected as shown below:

Add the following to the foreign application priority data:
--Oct. 21, 1976 [JP] Japan ........51/126640--

Signed and Sealed this

*Twenty-sixth* Day of *May 1981*

[SEAL]

*Attest:*

RENE D. TEGTMEYER

*Attesting Officer* *Acting Commissioner of Patents and Trademarks*